US010916131B1

(12) United States Patent
Schottland

(10) Patent No.: US 10,916,131 B1
(45) Date of Patent: Feb. 9, 2021

(54) INTERSECTION AND ROAD MONITORING FOR DISTRACTED OR UNSAFE DRIVERS

(71) Applicant: Paul Schottland, Fort Mill, SC (US)

(72) Inventor: Paul Schottland, Fort Mill, SC (US)

(*) Notice: Subject to any disclaimer, the term of this patent is extended or adjusted under 35 U.S.C. 154(b) by 0 days.

(21) Appl. No.: 16/589,294

(22) Filed: Oct. 1, 2019

(51) Int. Cl.
G08G 1/08 (2006.01)
B60W 50/14 (2020.01)
G06K 9/00 (2006.01)
B60W 40/08 (2012.01)

(52) U.S. Cl.
CPC ............ G08G 1/08 (2013.01); B60W 40/08 (2013.01); B60W 50/14 (2013.01); G06K 9/00785 (2013.01); G06K 9/00845 (2013.01); *B60W 2554/801* (2020.02)

(58) Field of Classification Search
CPC ...... G08G 1/08; G08G 1/0104; G08G 1/0116; G08G 1/017; G08G 1/07; B60W 50/14; B60W 40/08; B60W 2554/801; G06K 9/00785; G06K 9/00845
See application file for complete search history.

(56) References Cited

U.S. PATENT DOCUMENTS

| 9,092,986 | B2* | 7/2015 | Salomonsson ... G08G 1/096725 |
| 9,671,784 | B1 | 6/2017 | Dolgov et al. |
| 9,809,167 | B1* | 11/2017 | Badger, II ............. B60Q 9/008 |
| 10,019,898 | B2 | 4/2018 | Miller |
| 10,403,133 | B1 | 9/2019 | Christensen |
| 2013/0093582 | A1* | 4/2013 | Walsh .................... B60Q 1/525 340/436 |
| 2015/0302741 | A1* | 10/2015 | Vala ................. G08G 1/096741 340/916 |
| 2018/0144636 | A1* | 5/2018 | Becker ............. G08G 1/096783 |
| 2019/0295292 | A1* | 9/2019 | Oliva-Perez ........... B60Q 9/008 |
| 2019/0389487 | A1* | 12/2019 | Gowda .................. B60Q 1/503 |

* cited by examiner

*Primary Examiner* — Brian Wilson

(57) ABSTRACT

Systems, methods, and computer-executable instructions for detecting distances between vehicles near an intersection includes determining positions for each vehicle from video frames of an intersection. A status of a traffic light at the intersection is determined. Follow distances between a first vehicle and a second vehicle is determined. An alert condition associated with the second vehicle is determined based on the follow distance. A driver activity of a driver of the second vehicle is determined. An alert mechanism based on the alert condition and the driver activity is determined. An alert is provided using the alert mechanism to one or more drivers.

19 Claims, 4 Drawing Sheets

INTERSECTION AND ROAD MONITORING FOR DISTRACTED OR UNSAFE DRIVERS

BACKGROUND

Vehicles have incorporated various safety features to improve the safety of drivers and passengers. Safety features previously introduced include seat belts, airbags, collision avoidance, and lane detection. Even with these safety features, safety is still a concern for drivers. Accordingly, new or improved safety methods are being researched and developed. New safety methods that provide additional safety benefits are desirable.

DETAILED DESCRIPTION

Cameras have become ubiquitous in some place places, such as along roads. These cameras may be enhanced with new traffic safety features. For example, in various disclosed embodiments, cameras at an intersection may detect vehicles and determine the distance between vehicles as the vehicles approach the intersection and drive through the intersection. The distance may then analyzed to determine if there are any safety issues, such as a too fast approaching vehicle, a tailgating vehicle, etc. This information may be used to alert the dangerous vehicle or other vehicles near the intersection. In addition, the information may be used to automatically control the dangerous car to eliminate the safety issue. For example, the dangerous car may be instructed to slow its speed or to change lanes. Additionally, other vehicles may be instructed to avoid the dangerous vehicle. Drivers may also respond to learning that they are driving in a dangerous way. Accordingly, data may be transmitted to the driver alerting them to the conditions that were determined to be a safety concern for other drivers. In this manner, the described techniques achieve a variety of technical advantages including, but not limited to, faster detection of dangerous driving conditions near an intersection, increasing computing system speed, conserving memory, and reducing processor load.

Figure 1:
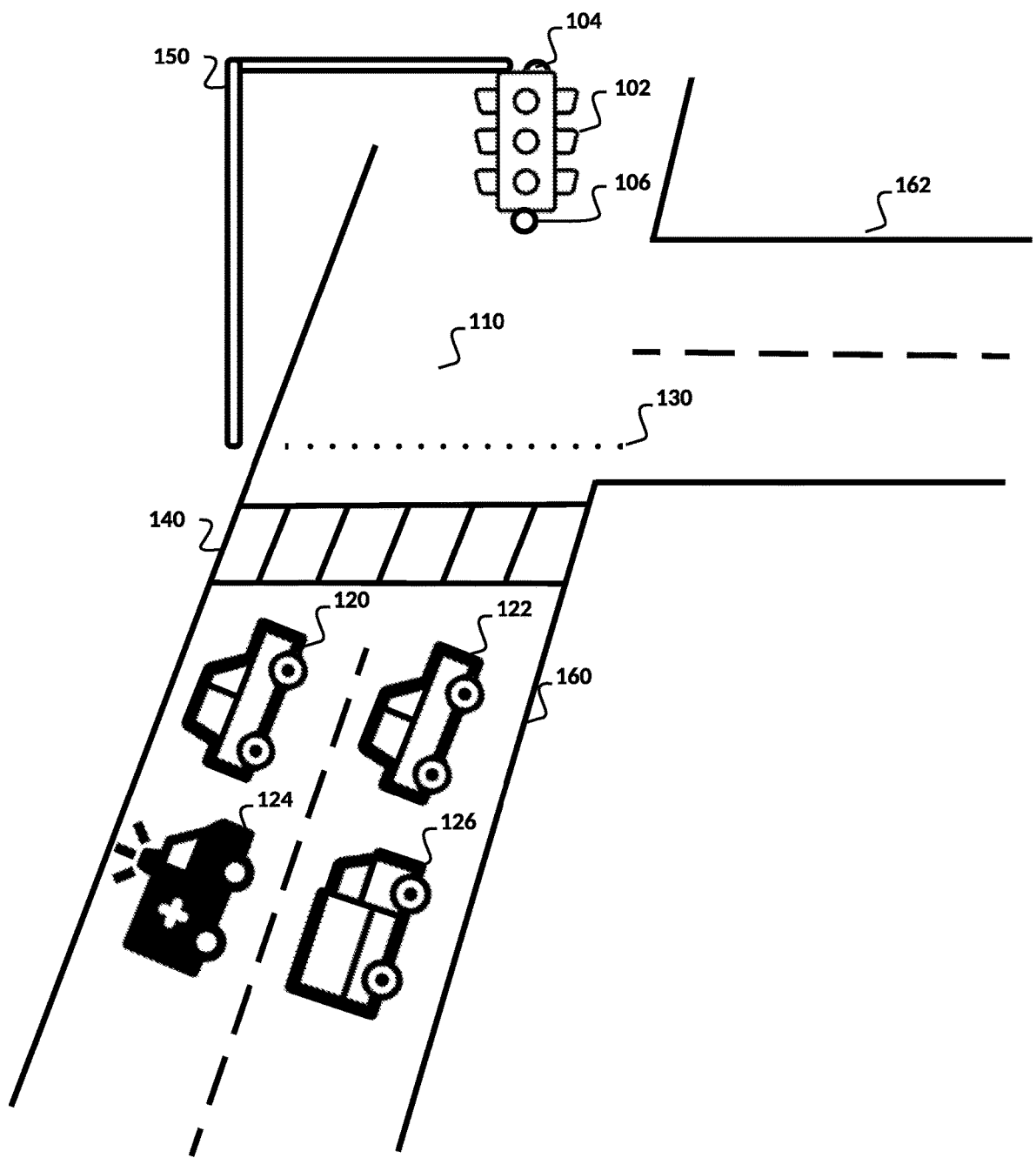
FIG. 1 is a system diagram for monitoring vehicles distances near an intersection in accordance with respective examples.

FIG. 1 is a system diagram for monitoring vehicles distances near an intersection 110 in accordance with respective examples. The intersection 110 includes a traffic light 102 that indicates if vehicles, e.g., 120, 122, 124, 126, should stop, yield, or go through the intersection 110. A camera 104 may be equipped on or near the traffic light 102. For example, the camera 104 may be equipped on the top or the bottom of the traffic light 102 or on traffic light's support pole 150. In other examples, the camera may be suspended using wires over an intersection rather than on a traffic light. In yet other examples, the camera may be located anywhere the camera is able to capture image data that includes vehicles approaching an intersection. For example, a drone may be used to carry the camera over an intersection for a period of time for data analysis. The camera 104 records traffic in at least one direction, e.g., the traffic approaching the intersection 110 and eventually continuing through the intersection 110. In other examples, the camera 102 may be attached to a stop sign rather than a stop light.

A computing device, not shown, processes multiple pictures, video frames, etc., from the camera 104. The processing includes detecting and recognizing vehicles approaching the intersection, e.g., 120, 122, 124, and 126. In an example, the speed and distance between the vehicles are determined from the data from the camera 104. The speed and distance may be used to determine if a safety condition exists. Safety conditions include conditions that indicate a potential accident or could cause an accident in different situations. For example, if an oncoming vehicle is approaching another vehicle already stopped at the intersection 110, the speed and distance may be monitored to determine if the approaching vehicle is approaching the stopped vehicle too quickly. As another example, a vehicle that approaches a red light too quickly and comes to a complete stop in or near a crosswalk 140 may be considered a safety condition, even if there are no people within the crosswalk.

The data from the camera 104 may also be used to monitor the distances and speeds as the vehicles go through the intersection. The camera 104 or the computing device may receive an indication of a status of the traffic light 102. The status may be used to determine a set of behaviors of the vehicles. For example, at a red light the vehicles should be stopped at the intersection 110 or slowing down as they approach the intersection 110. If the traffic light 102 is green, the vehicles should be moving through the intersection 110 or waiting for a vehicle closer to the intersection to begin moving. As another example, the behavior of a vehicle when approaching a yield status, such as a yellow light, may be to either speed up or slow down. These behaviors may be used to determine an alert status. In one example, the traffic light status is determined based on the camera data. For example, the data may be analyzed to determine the color of the traffic light 102 based on reflections from the vehicles or other objects. In addition, data from other cameras with data from the intersection 110 but recording traffic approaching the traffic light 102 from a different direction may also be analyzed for consistency. For example, the traffic light cannot be green for both directions 160 and 162. Accordingly, analyzing data from both cameras would allow the status of the traffic light to be determined and confirmed. Alternatively, data from one camera may be used to determine the status of the traffic light in one direction, with the status of the traffic light in another direction inferred from detect status in the one direction. In other examples, the camera 102 is able to capture data of both the directions 160 and 162. In some examples, the camera 102 is able to capture data of all directions of the intersection 110. In examples where multiple directions are captured in the data, the computing device analyzes the camera data and analyzes the data associated with one direction separately from data associated with another direction. The resulting data may be combined, such as to determine the status of the traffic light 102 or to determine safety issues such as a potential collision between two vehicles both entering the intersection 110 from different directions.

If a safety condition is detected an alert may be created and transmitted. In some examples, any safety condition results in an alert. In other examples, only certain safety conditions trigger an alert. Accordingly, the safety condition may be analyzed along with other data to determine an alert condition. The alert condition may indicate that an alert should be sent, the recipients of the alert, and how the alert is to be transmitted. As an example, a light 106 may be used to indicate a safety condition exists at the intersection 110. The light 106 may be flashed to indicate that a safety condition exists in an attempt to alert the driver or other drivers. Other alerts, such as a text message or a message displayed within a vehicle may be sent.

The camera data may also be analyzed to determine if a driver is stopped at an intersection 110 when the driver should be starting to proceed through the intersection 110. For example, a driver in vehicle 126 may be looking at their phone when the traffic light 102 changes to green. Vehicle 122 begins to proceed through the intersection 110 but the driver in vehicle 126 did not notice the change in the traffic light 102 since the driver is looking at their phone or is otherwise distracted. The distance between the vehicle 122 and vehicle 126 increases as the vehicle 122 continues to drive through the intersection 110. In addition, the state of the traffic light 102 facing the vehicle 126 is known to be green, as explained above. Therefore, the computing device recognizes that the vehicle 126 should be proceeding through the intersection 110 but remains still. In an example, based on the speed of the vehicle 126 and the increasing distance between the vehicles 122 and 126, the computing device determines that the vehicle 126 is not stopped. As another example, the time between vehicles passing a particular point, such as a crosswalk 140 or an intersection point 130, is used to indicate an excessive delay caused. For example, a configurable parameter set to 3, 5, 10, etc. seconds may be used to determine if a driver is causing a delay.

The computing device may analyze the camera data to determine if the driver of the vehicle 126 is distracted. For example, object detection regarding a phone, table, newspaper, etc., may be done using the camera data. The position of the driver's head may also be determined from the camera data. Using the object detection and head position data, the computing device may determine if the driver is distracted from looking at the traffic light 102. For example, a driver that is not looking at the traffic light or is looking at a detected device is considered to be distracted. A determination that there is a distracted driver is an example of a safety condition. A line of vehicles in a lane at a traffic stop may be analyzed, such that each vehicle is analyzed for follow distances, speed, alert conditions, etc.

In an example, the computing device may calculate a delay to both the vehicle 126 and other vehicles that are delayed due to the driver of the vehicle 126 not moving. This calculated delay may be the summation of the delay of all vehicles at the intersection 110 caused or associated with the vehicle 126. For example, the delay for one vehicle may be the actual time to pass through the intersection subtracted by an estimated time for a vehicle to through the intersection without a delay. This calculation may be applied to each vehicle behind a delayed vehicle and the total delay may be attributed to the vehicle, such as the vehicle 126. The total delay may be communicated to the driver. The total delay may also be compared to the delay caused by an average driver. The average driver may be other drivers at the same intersection or other drivers that drive at the same time/day, same age, same type of car, etc. In an example, a vehicle is assumed to be in the intersection 110 once the vehicle has passed a line 130 that can be determined from image data from the camera 104. In addition, the amount of time any one vehicle was delayed may be communicated to that particular vehicle, even if that vehicle did not cause the delay.

The type of delay may also be determined by analyzing the image data from the camera. For example, delays caused by distracted drivers looking at devices may be detected as described above. Other delays may also occur, such as a broken down vehicle, a flat tire, an ambulance going through the intersection, an accident, etc. Accordingly, different types of delays may be determined. Delays of similar types may be combined together for drivers. For example, distracted driving delays may be grouped together and separately from delays caused by flat tires, accidents, broken down car, etc. Disclosed embodiments, therefore, may detect a distracted driver was not advancing through an intersection that has a green light, while the vehicles in front of the driver have already proceeded through the intersection. The determination of a distracted driver may be determined by one or more configurable parameters, such as a maximum acceptable follow distance, speeds of the vehicle, etc.

Data from the camera 104 may also be used to detect and identify license plate data. In addition, a make, model, and color of a vehicle may be determined. This data may be used to identify a particular vehicle such that data from multiple intersections may be combined.

Figure 2:
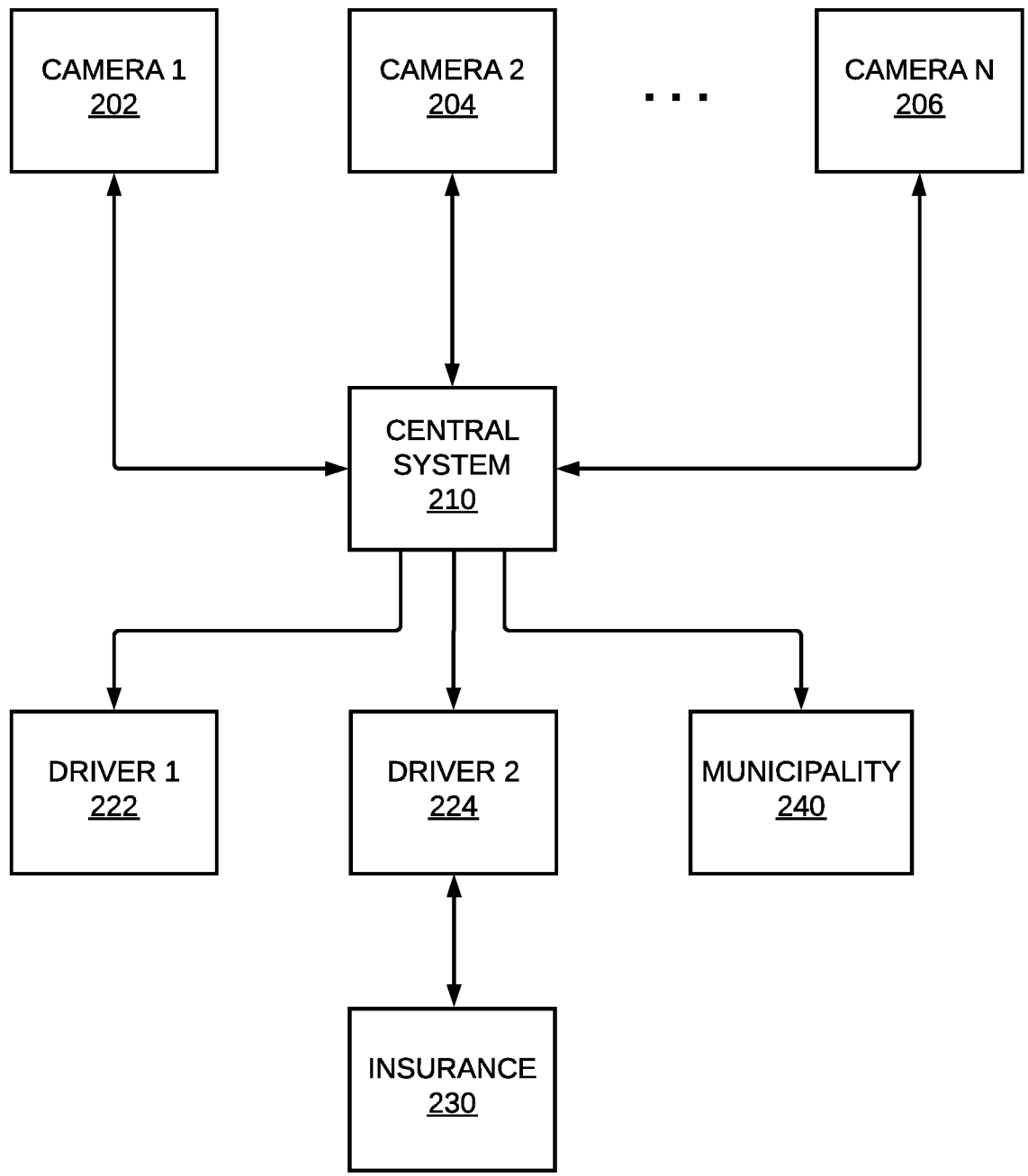
FIG. 2 is a block diagram of a system for data collection from monitoring vehicles distances near multiple intersections in accordance with respective examples.

FIG. 2 is a block diagram of a system for data collection from monitoring vehicles distances near multiple intersections in accordance with respective examples. Cameras 202, 204, and 206 capture image data as described above. The image data may be processed by a computing device within the camera, near the camera, or at a central system 210. Accordingly, the central system 210 may receive the image data to process or may receive the delay information calculated at the camera or at a computing device. The central system 210 may provide aggregated data to a particular driver, such as driver 222 or 224. For example, the central system 210 may provide the total delay caused by the driver over a period of time or provide how much delay the driver suffered due to other drivers. The aggregated data may include a breakdown of the types of delays and the length of time the driver was delayed for each type of delay. The driver 224 may provide their aggregated data to their insurance company 230. The driver 224 may be willing to share such information to receive from benefit from the insurance company 230, such as lower premiums, etc. The aggregated may be anonymized and provided to third parties such as a municipality where the interactions are located. The anonymized data may also be made available to city planners or researchers.

Figure 3:
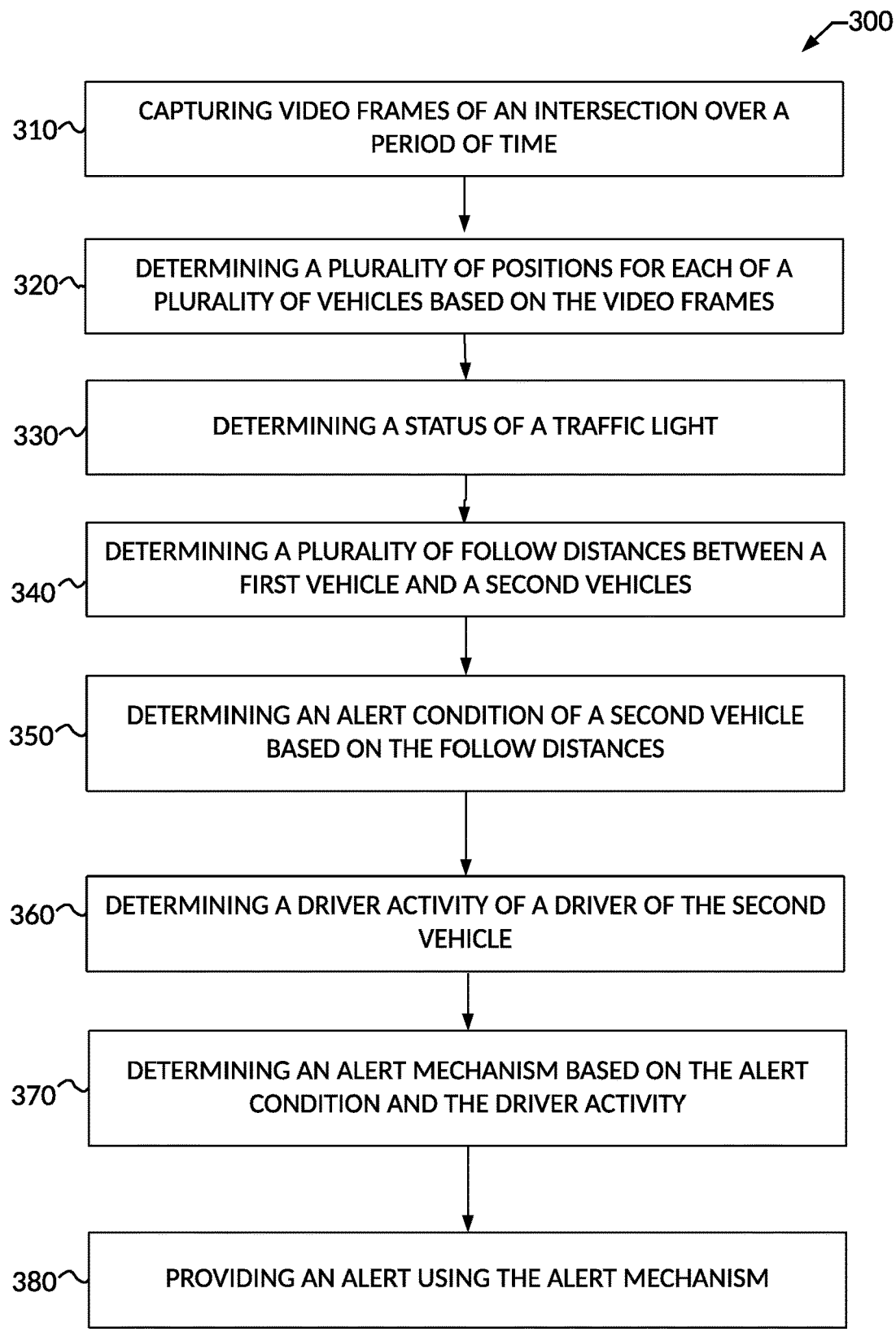
FIG. 3 is a flow diagram of a process for monitoring vehicles distances near an intersection in accordance with respective examples.

FIG. 3 is a flow diagram of a process 300 for monitoring vehicles distances near an intersection in accordance with respective examples. In operations 310, a camera at the intersection captures video frames of the intersection over a period of time. For example, the camera may capture video frames cover a traffic light going from green to yellow to red and back to green. These frames include the same vehicles approaching the intersection, waiting at the intersection, and proceeding through the intersection. The camera may also be positioned on a stop sign, a yield sign, etc. The camera may capture video frames which covers a vehicle approaching, stopping and proceeding through the intersection.

In operation 320, the video frames are analyzed to identify positions of vehicles within the video frames. For example, starting at the first video frame vehicles within this video frame may be identified. Vehicles may include cars, trucks, vans, motorcycles, etc. In addition, non-vehicle objects may be detected, such as cyclists, pedestrians, pets, etc. The position of the vehicles in the first frame may be determined. In subsequent frames, the position of the vehicles is determined and a change in position may also be calculated. In addition, the distance between two vehicles may be calculated. Subsequent calculations indicate if the distance between the vehicles is increasing, decreasing or staying the same. New vehicles may also be first recognized in later video frames. A running list of identified vehicles may be kept and newly identified vehicles may be added to this list. In addition, vehicles that pass through an intersection may be removed from this list.

In operation 330, the status of the traffic light is determined. The status of the traffic light indicates if the vehicles at the intersection facing the traffic light should move through the intersection or wait at the intersection. The status of the traffic light may be used to determine if the vehicles at the intersection should start moving through the intersection. For example, when a traffic light changes from red to green, the vehicles should start moving through the intersection. The status of the traffic light may be determined from the video frames. For example, the video frames may be analyzed looking for reflected light off of objects within the video frames from the traffic light. In an example, if light is detected from multiple vehicles or that objects that matches one of a certain number of colors, the color may be used to determine the status of the traffic light. For example, red lights detected reflected from multiple vehicles or objects, the status of the traffic light is determined to be stopped. In another example, the movement of the vehicles may be used to determine the status of the traffic light. For example, if vehicles are moving towards and pass a point of the intersection, such as a crosswalk or line 130 from FIG. 1, the status of the traffic light is determined to be green or go. Video frames from other directions of the traffic light may be used to determine or verify the status of the traffic light. For example, vehicles on opposite sides of the intersection may move through the intersection at the same time, while perpendicular directions are stopped. The movement of the vehicles from multiple directions may be combined to determine the status of the traffic light. This allows the status of a traffic light to be determined from the video frames even if there are no vehicles in one lane but there are vehicles in other directions. In another example, the status of the traffic light may be determined based on a change in current or voltage that is applied to one of the lights within the traffic light.

In an operation 340, following distances between pairs of vehicles is determined. The follow distance is the distance between two vehicles moving in the same direction as the vehicles approach or go through the intersection. In an example, the first vehicle may be the vehicle in front or closer to the intersection compared to a second vehicle. In an example, the two vehicles are in the same lane of traffic.

In an operation 350, an alert condition is determined to exist based on the follow distances, such as the follow distance associated with the second vehicle. An example alert condition is a driver that delays moving through the intersection. In this example, the follow distance of the delayed driver and the car in front will increase over time. Once the follow distance reaches a predetermined threshold, e.g., 10 feet, 15 feet, 30 feet, etc., a delayed alert condition may be determined. The speed of the vehicles may also be taken into consideration. For example, if the first vehicle speeds away a delayed condition may be determined not to exist if the second vehicle is moving. A delay condition may also be determined based on the second vehicle not moving for more than a predetermined amount of time after the first vehicle starts to move or when the status of the traffic light changes to green or go through the intersection. The amount of time may be 0.5 seconds, 1 second, 2 seconds, etc.

Another example alert condition is a tailgating vehicle that is approaching another vehicle too quickly. In an example, the speed of the first vehicle and the second vehicle is determined. An estimated future distance between the two vehicles may be determined based on the speeds of the vehicles. Acceleration and deceleration of the two vehicles may also be taken into account in determining the future distance. If the estimated future distance is below a predetermine threshold, the tail gating alert condition is determined to exist. For example, if the distance is less than 5 feet, 10 feet, 15 feet, etc. or if the future distance indicates the two vehicles will touch the tailgating delay condition exists. The speed of the vehicles may also be used to determine the distance to determine if the condition exists. For example, slower moving vehicles may use a smaller distance compared to faster moving vehicles.

In an operation 360, a driver activity of a driver of the second vehicle is determined based in part on the video frames. The driver activity may indicate what the driver is doing. For example, the driver may be looking at a phone, looking out the window, looking behind them, etc. In an example, determining the driver activity includes determining a head position of the driver during the alert condition from the video frames. In addition, object detection may also occur to determine objects within the driver's vehicle. The position of the object may be determined from the video frames. Based on the head position of the driver and the object position, a determination is made to determine if the driver is looking at the device. For example, if the head position indicates the driver's face is pointed towards the object, the driver is considered to be looking at the object and distracted from driving. For example, the driver may be determined to be looking down at a device or looking away from the intersection.

In an operation 370, an alert mechanism is determined based on the alert condition and the driver activity. The alert mechanism may indicate an alert light should flash, a text should be sent one or more drivers, an audible alert should be played, etc. The type of alert may depend on the alert condition and driver activity. For example, a tailgating alert condition where the estimated future distance indicates a crash may cause both an audible and flashing light alert mechanism to occur. A text message or email to a driver that is distracted may be used.

In an operation 380, an alert is provided using the alert mechanism to one or more drivers of the vehicles. In an example, a light that may be located on a traffic light or road sign may be turned on or flashed to warn vehicles at the intersection of the alert condition. The flashing light may be controlled based on the alert condition. For example, a faster pulsing of the light may occur if a driver is driving fast and the speed is a factor of the alert condition. As another example, a vehicle approaching a delayed vehicle may have an alert sent to the driver warning the approaching driver of the delayed driver. The alert may be sent via text, SMS, email, or directly to the car using vehicle communication system. In an example, the video frames may be analyzed to determine an identifier of the vehicle, such as license plate, color, make, model, and year of the vehicle. In some examples, a driver may be identified or combined with the vehicle identifiers to determine who should receive an alert. In some examples, the initial alert of subsequent alert may also include a request for the vehicle to take a particular action. For example, a fast approaching car may be asked to slow down.

If a delay condition is determined, the amount of delay caused by the driver may be determined. For example, the vehicles that experienced some delays due to the delayed vehicle are determined from the video frames. For example, vehicles behind the delayed vehicle that slow down or stop due to the delayed vehicle experience some delay caused by the delayed vehicle. The delay each vehicle experiences may be determined from the video frame. For example, an estimated time to go through the intersection may be determined assuming the delayed vehicle was not delayed. The actual time through the intersection may be calculated and the difference from these two values may be calculated as the delayed caused by the delayed vehicle. The aggregated delay may be sent to the driver that caused the delay as part of the alert mechanism.

The data collected by disclosed examples may be used to calculate a driver score or driver safety score based on the video frames. The driver safety score may be a calculation of the delay or following distance which occurs over time in the intersection from one vehicle to the vehicle in front or behind the other vehicles. The driver score may be based on an average follow distance, the number of alert conditions, the average delay time, the aggregated delay of other vehicles, etc. In an example, an average follow distance of a vehicle is determined. A driver score for the driver of the vehicle may be calculated from the average follow distance. For example, a score of 100 would indicate that the driver's follow distance is always within a range. If an average follow distance for one trip through an intersection is outside the range, the driver's score can be decreased. A camera system may calculate the driver score for each driver each time the driver goes through the intersection. This driver score may be transmitted to a remote server. The remove server may calculate an aggregated driver score for a particular driver based on driver scores from multiple intersections. This may occur when the camera systems provide a driver identifier with the aggregated score. The driver identifier may be an anonymized identifier. The aggregated driver score may be provided to the driver, municipalities, police, etc. The driver may also provide or allow access to their aggregated score to an insurance company. The insurance company may use the driver score in determining an insurance rate for the driver.

As another example, a system may be installed along a highway or road in a position unrelated to an intersection. In these installations, the status of traffic flow along the road may be determined. The status may be the traffic is flowing normally, is slowed, is stopped, etc. As another example, the status may be slowed due to construction. The indication that the road is under construction may be used to change the parameters the system uses to determine an alert condition. For example, the minimum follow distance between cars that indicates an alert condition may be increased to account for the construction. Acceptable speed may also be decreased to account for construction. In these examples, distracted drivers may be detected as vehicles pass into and out of the camera's view. The head position and object detection may also be used to determine if the driver is distracted as described above.

Figure 4:
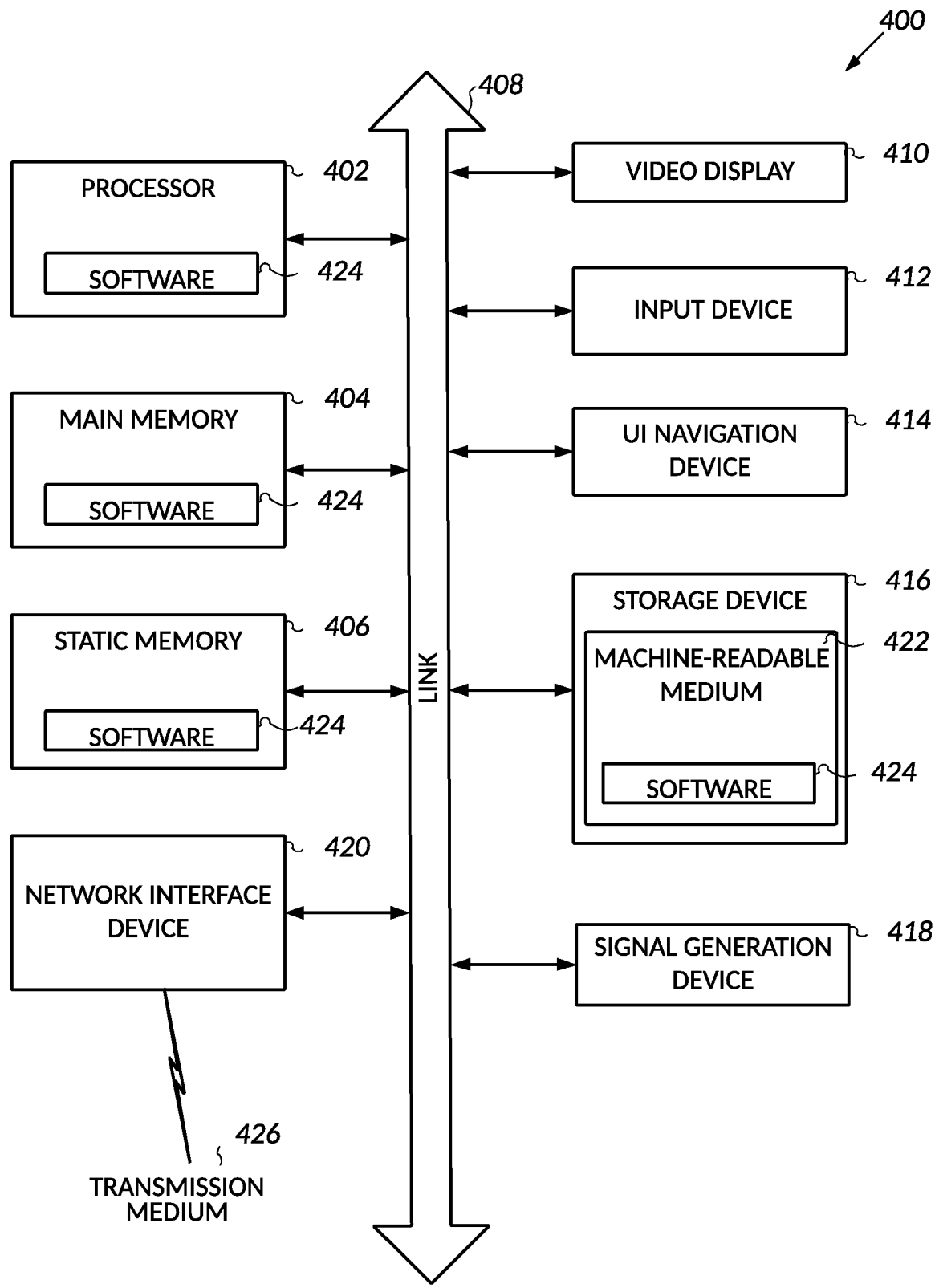
FIG. 4 is an example computing device that can be used in conjunction with the technologies described herein.

FIG. 4 is an example computing device that can be used in conjunction with the technologies described herein. In alternative embodiments, the computing device 400 may operate as a standalone device or may be connected (e.g., networked) to other computing devices. In a networked deployment, the computing device 400 may operate in the capacity of a server communication device, a client communication device, or both in server-client network environments. In an example, the computing device 400 may act as a peer computing device in peer-to-peer (P2P) (or other distributed) network environment. The computing device 400 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of the computing device used at the intersection or central system 210, and perform the method of FIG. 3.

Computing device 400 may include a hardware processor 402 (e.g., a central processing unit (CPU), a graphics processing unit (GPU), a hardware processor core, or any combination thereof), a main memory 404 and a static memory 406, some or all of which may communicate with each other via a link (e.g., bus) 408. The computing device 400 may further include a display unit 410, an input device 412 (e.g., a keyboard), and a user interface (UI) navigation device 414 (e.g., a mouse). In an example, the display unit 410, input device 412, and UI navigation device 414 may be a touch screen display. In an example, the input device 412 may include a touchscreen, a microphone, a camera (e.g., a panoramic or high-resolution camera), physical keyboard, trackball, or other input devices.

The computing device 400 may additionally include a storage device (e.g., drive unit) 416, a signal generation device 418 (e.g., a speaker, a projection device, or any other type of information output device), a network interface device 420, and one or more sensors, such as a global positioning system (GPS) sensor, compass, accelerometer, motion detector, or other sensor. The computing device 400 may include an input/output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 416 may include a computing-readable (or machine-readable) storage media 422, on which is stored one or more sets of data structures or instructions 424 (e.g., software) embodying or utilized by any one or more of the techniques or functions described herein. In an example, at least a portion of the software may include an operating system and/or one or more applications (or apps) implementing one or more of the functionalities described herein. The instructions 424 may also reside, completely or at least partially, within the main memory 404, within the static memory 406, and/or within the hardware processor 402 during execution thereof by the computing device 400. In an example, one or any combination of the hardware processor 402, the main memory 404, the static memory 406, or the storage device 416 may constitute computing device (or machine) readable media.

While the computer-readable storage media 422 is illustrated as a single medium, a "computer-readable storage media" or "machine-readable storage media" may include a single medium or multiple media (e.g., a centralized or distributed database, and/or associated caches and servers) configured to store the one or more instructions 424.

In an example, a computer-readable storage media or machine-readable storage media may include any medium that is capable of storing, encoding, or carrying instructions for execution by the computing device 400 and that cause the computing device 400 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 420 may use the transfer protocols to transmit data using transitory propagating signals.

In an example, the network interface device 420 may include one or more physical jacks (e.g., Ethernet, coaxial, or phone jacks) or one or more antennas to connect to the communications network 426. In an example, the network interface device 420 may include one or more wireless modems, such as a Bluetooth modem, a Wi-Fi modem or one or more modems or transceivers operating under any of the communication standards mentioned herein. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques. In an example, a transmission medium may include any intangible medium that is capable of storing, encoding or carrying instructions for execution by the computing device 400, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for detecting distances between vehicles near an intersection, the method comprising operations performed using an electronic processor, the operations comprising:
    capturing, using a camera, video frames of the intersection over a period of time;
    determining, for each of a plurality of vehicles, a plurality of positions for each of the plurality of vehicles from the video frames, wherein the plurality of vehicles comprise at least two vehicles;
    determining a plurality of follow distances between a first vehicle and a second vehicle based on the plurality of positions of the first vehicle and the second vehicle, wherein the plurality of vehicles comprises the first vehicle and the second vehicle, and wherein the first vehicle is located in front of the second vehicle;
    determining, based on the plurality of follow distances, an alert condition associated with the second vehicle;
    determining a driver activity of a driver of the second vehicle based in part on the video frames;
    determining an alert mechanism based on the alert condition and the driver activity;
    identifying a third vehicle approaching the second vehicle; and
    providing an alert using the alert mechanism to one or more drivers of the plurality of vehicles, wherein the alert it sent to a driver of the third vehicle.

2. The method of claim 1, wherein the determining, based on the plurality of follow distances, the alert condition associated with the second vehicle comprises determining a delay in movement of the second vehicle is greater than a predetermined threshold.

3. The method of claim 1, wherein the determining, based on the plurality of follow distances, the alert condition associated with the second vehicle comprises:
    determining a first speed of the first vehicle;
    determining a second speed of the second vehicle;
    determining an estimated future distance between the first vehicle and the second vehicle based on the first speed and the second speed; and
    determining the estimated future distance is less than a predetermined threshold.

4. The method of claim 1, further comprising:
determining a follow distance of the second vehicle from the video frames;
determining a driver score based on the follow distance for the driver of the second vehicle; and
sending the driver score to a remote server, wherein the remote server calculates an average driver score from multiple driver scores associated with the second driver.

5. The method of claim 1, wherein the determining the driver activity of the driver of the second vehicle comprises:
determining a head position of the driver;
determining a location of a device within the second vehicle, wherein the device is not part of the second vehicle; and
determining the driver is viewing the device based on the head position and the location of the device.

6. The method of claim 1, further comprising determining identifying characteristics of the second vehicle.

7. The method of claim 1, wherein the alert condition comprises a driver delay, and the method further comprises:
determining, from the video frames, a set of vehicles from the plurality of vehicles that experience a delay based on the driver delay; and
determining an aggregate delay of the set of vehicles.

8. The method of claim 7, wherein providing the alert comprises providing the aggregate delay to the driver of the second vehicle.

9. The method of claim 1, further comprising determining a status of a traffic light at the intersection related to a direction of travel of the plurality of vehicles, wherein the status is proceed through the intersection.

10. The method of claim 9, wherein the determining the status of the traffic light at the intersection comprises detecting a change in color of the traffic light from reflections of light from the traffic light captured in the video frames.

11. The method of claim 9, wherein the determining the status of the traffic light at the intersection comprises detecting, using a circuit, a change in current or voltage supplied to one light of the traffic light.

12. The method of claim 9, wherein the determining the status of the traffic light at the intersection comprises detecting movement of a vehicle towards the intersection and detecting a position of the vehicle to be beyond a threshold position.

13. The method of claim 9, wherein the first vehicle and the second vehicle are stopped at the intersection prior to the status of the traffic light being proceed.

14. The method of claim 9, wherein the alert mechanism comprises a light associated with the traffic light, and wherein providing the alert comprises controlling the flashing of the light.

15. The method of claim 9, further comprising:
determining a start delay of the second vehicle to initiate motion from a stopped position based on the status of the traffic light;
determining the start delay is greater than a predetermined delay threshold; and
providing a delay alert using the alert mechanism to one or more drivers of the plurality of vehicles based on the determination that the start delay is greater than the predetermined delay threshold.

16. A system for detecting distances between vehicles near an intersection, the system comprising:
a camera to capture video frames of the intersection over a period of time; and
at least one electronic processor to:
determine, for each of a plurality of vehicles, a plurality of positions for each of the plurality of vehicles from the video frames, wherein the plurality of vehicles comprise at least two vehicles;
determine a plurality of follow distances between a first vehicle and a second vehicle based on the plurality of positions of the first vehicle and the second vehicle, wherein the plurality of vehicles comprises the first vehicle and the second vehicle, and wherein the first vehicle is located in front of the second vehicle;
determine, based on the plurality of follow distances, an alert condition associated with the second vehicle;
determine a driver activity of a driver of the second vehicle based in part on the video frames;
determine an alert mechanism based on the alert condition and the driver activity;
identify a third vehicle approaching the second vehicle; and
provide an alert using the alert mechanism to one or more drivers of the plurality of vehicles, wherein the alert it sent to a driver of the third vehicle.

17. The system of claim 16, wherein to determine the driver activity of the driver of the second vehicle the at least one electronic processor is configured to:
determine a head position of the driver;
determine a location of a device within the second vehicle; and
determine the driver is viewing the device based on the head position and the location of the device.

18. A non-transitory computer-readable storage medium storing computer-executable instructions for detecting distances between vehicles near an intersection, the stored instructions comprising:
instructions to receive, from a camera, video frames of the intersection over a period of time; and
instructions to determine, for each of a plurality of vehicles, a plurality of positions for each of the plurality of vehicles from the video frames, wherein the plurality of vehicles comprise at least two vehicles;
instructions to determine a plurality of follow distances between a first vehicle and a second vehicle based on the plurality of positions of the first vehicle and the second vehicle, wherein the plurality of vehicles comprises the first vehicle and the second vehicle, and wherein the first vehicle is located in front of the second vehicle;
instructions to determine, based on the plurality of follow distances, an alert condition associated with the second vehicle;
instructions to determine a driver activity of a driver of the second vehicle based in part on the video frames;
instructions to determine an alert mechanism based on the alert condition and the driver activity;
instructions to identify a third vehicle approaching the second vehicle; and
instructions to provide an alert using the alert mechanism to one or more drivers of the plurality of vehicles, wherein the alert it sent to a driver of the third vehicle.

19. The non-transitory computer-readable storage medium of claim 18, wherein the instructions to determine, based on the plurality of follow distances, the alert condition associated with the second vehicle comprises instructions to determine a delay in movement of the second vehicle is greater than a predetermined threshold.

* * * * *